Aug. 10, 1954  R. S. ZEBARTH  2,685,706
POULTRY SHACKLE HAVING TUBULAR LOCKING MEMBER
Filed Sept. 5, 1950
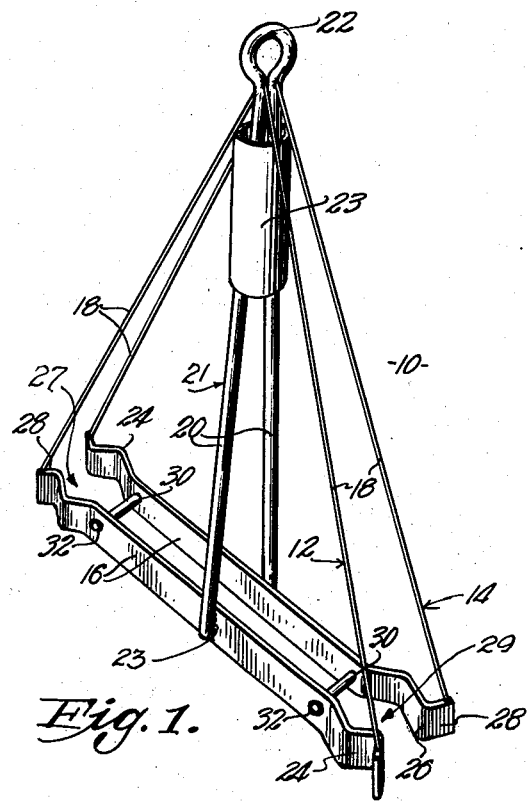
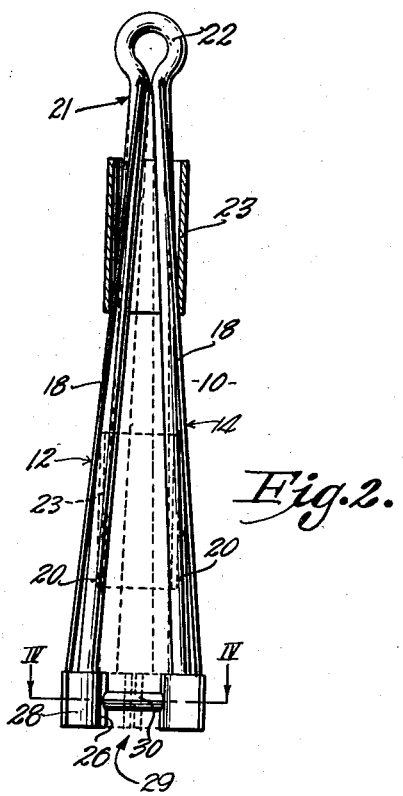
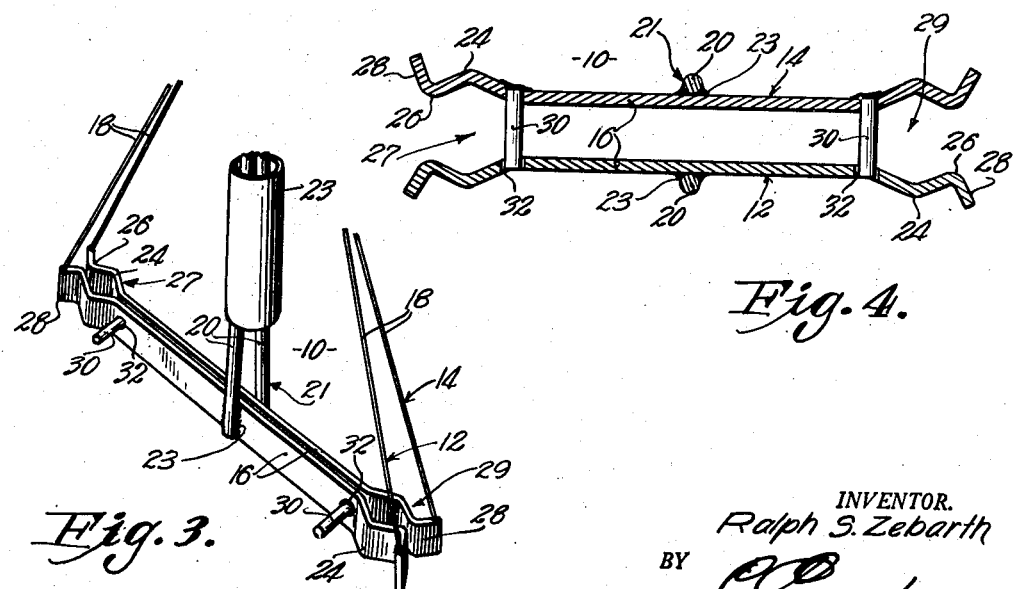
INVENTOR.
Ralph S. Zebarth
BY
ATTORNEY

Patented Aug. 10, 1954

2,685,706

UNITED STATES PATENT OFFICE 2,685,706

POULTRY SHACKLE HAVING TUBULAR LOCKING MEMBER

Ralph S. Zebarth, Hickman Mills, Mo., assignor to Gordon W. Johnson Company, Kansas City, Mo., a corporation of Missouri Application September 5, 1950, Serial No. 183,126

1 Claim. (Cl. 17—44.1)

This invention relates to equipment for use in the dressing of poultry, the primary object being to provide a relatively simple, inexpensive shackle adapted to support the poultry by the legs thereof, while the same is being slaughtered, singed and otherwise treated during the dressing process.

It is the most important object of the present invention to provide a shackle that includes a pair of substantially identical frame members, movable to and from a position with parts thereof juxtaposed and adapted to receive the poultry legs, the means of interconnecting the frames being resilient and formed to yieldably hold the said leg-receiving members biased apart.

Another important object of this invention is the provision of a poultry shackle that is provided with simple, inexpensive, easily operated means that may be manually grasped and thereby reciprocated to and from a position for clamping certain parts of the frame together in a position for holding the poultry legs against displacement.

Another object of this invention is the provision of a poultry shackle having a pair of elongated members movable toward and from each other, and each formed to cooperate in presenting a pair of closed recesses when juxtaposed, each adapted to receive a poultry leg.

Other objects of the present invention include the way in which the leg-receiving parts of the shackle are provided with elements to present a stop, thereby facilitating the placement of the legs between the members; the way in which the entire sectional frame is yieldably biased apart in an inoperative position through the medium of a single wire rebent upon itself; and the manner of reinforcing as well as protecting the various parts of the shackle against accidental lodgement or catching upon parts of other equipment within the paths of travel of the shackle.

More minor objects will be made clear as the specification hereof progresses, reference being had to the accompanying drawing wherein:

Figure 1 is a perspective view of a poultry shackle having a tubular locking member made pursuant to the present invention.

Fig. 2 is an end elevational view thereof.

Fig. 3 is a fragmentary, perspective view similar to Fig. 1 but showing the shackle closed; and Fig. 4 is a transverse, cross-sectional view taken on line IV—IV of Fig. 2 looking in the direction of the arrows.

The shackle forming the subject matter of this invention is broadly designated by the numeral 10 and includes a pair of substantially identical frame members, which in turn are broadly designated by the numerals 12 and 14.

Frame members 12 and 14 each includes a substantially rigid bar 16 constituting the base of the triangular-shape thereof, together with a pair of elongated wire members 18 that comprise the sides of the closed triangle and that converge as the uppermost apex end thereof is approached. The two side members 18 of each frame 12 and 14 join at the lowermost ends thereof directly with the bar 16 at its outermost extremities by welding or other means of affixation. Each frame member 12 and 14 additionally includes an elongated rod or the like 20, disposed along the altitude line of the triangle and joined directly to bar 16 midway between the ends thereof and upon the outermost face thereof by welding 23 or the like. The uppermost end of the rod 20 receives the proximal ends of the side members 18 also by welding or similar means of attachment. The rods 20 are joined at the uppermost ends thereof by an integral eye or loop 22, presenting a support having its apex formed by loop 22.

In actual construction, the two rods 20 and the the loop 22 thereof are formed from an initially straight length of resilient material rebent upon itself in the manner illustrated in the drawing to present a support 21. The rods 20 normally diverge as the lowermost ends thereof are approached. Prior to attachment of the rods 20 to the corresponding bars 16, a tubular member 23 is threaded upon the rods 20 for sliding movement thereon. The inside diameter of the tube 23 is less than the combined thicknesses of the two rods 20 and the two bars 16 as is illustrated in Fig. 3. Each end of each bar 16 is S-shaped, presenting an outwardly arched portion 24 and an inwardly arched part 26 that terminates in an outwardly flared end 28.

One of the bars 16, and in the instance illustrated, the bar 16 of frame section 14 is provided with a pair of spaced-apart pins 30 extending inwardly from the innermost face thereof and joined directly thereto adjacent each arched portion 24 respectively. Similarly, the elongated rigid bar 16 of the frame member 12 is provided with an opening 32 for slidably receiving each pin 30 respectively. The pins 30 and arched portions 24 cooperate in presenting loops 27 and 29.

The entire shackle 10 is adapted for suspension from a conveyor or the like, not shown, through the medium of the loop 22 thereof and is normally in the condition illustrated in Fig. 1 with the opposed identical bars 16 thereof held biased apart by the inherent resiliency of the rods 20 and their integral loop 22.

When it is desired to place the shackle 10 in use, the operator simply moves the legs of the fowl to be slaughtered or otherwise treated for dressing, between the arched portions 24 of the bars 16 and either moves the latter together, permitting the tube 23 to drop by force of gravity, or by grasping the tube 23 and moving the same downwardly to in turn clamp the bars 16 together. Obviously, as tube 23 moves or is moved downwardly from the position illustrated in Fig. 1 and in full lines in Fig. 2 adjacent the loop 22 to the position illustrated in Fig. 3 and in dotted lines of Fig. 2, the lowermost diverging ends of the rods 20 will be moved together and held clamped within the tube 23. Figs. 2 and 3 both illustrate the way in which tube 23 is spaced above the uppermost longitudinal edges of the bars 16 when the latter are in a position with their innermost faces interengaging. When the bars 16 are in such position, there is presented a pair of closed perforations at the ends thereof defined by the oppositely arched portions 24 and it is within these perforations that the two legs of the fowl are disposed when the shackle 10 is placed in use. The opposed outwardly flared ends 28 of the bars 16 facilitate the placement of the legs into such perforations and the pins 30 serve as stops to prevent accidental movement of the legs beyond the arched portions 24 of the shackle 10. By virtue of openings 32 of the frame member 12, the pins 30 slide easily within the bar 16 of frame 12 as the frames 12 and 14 are moved toward and away from each other.

The sides 18 of the triangular-shaped frames 12 and 14 not only support the bars 16 but present a shackle 10 that is not likely to catch or become lodged upon tanks and other equipment within the path of travel of a plurality of the shackles 10 hanging or depending from an overhead conveyor therefor.

It is to be appreciated from the foregoing that the shackle hereof is inexpensive, strong and therefore, not likely to become damaged through use and highly efficient from the standpoint of positively holding the fowl against accidental loss during the slaughtering process. Furthermore, the shackle may be quickly and easily placed in use to attach the bird thereto and remove the same with a minimum amount of effort.

With the broad concepts of this invention in mind, it is appreciated that details of construction may be made within the spirit of the invention and it is, therefore desired to be limited only by the scope of the appended claim.

Having thus described the invention, what is claimed as new and desired to be secured by Letters Patent is:

A releasable shackle for suspending a fowl by its feet comprising a pair of triangular frame members, each having an elongated bar forming the base thereof and a pair of wire sides diverging as the bar is approached; a V-shaped support including a pair of rods and an eye integral with the rods at the uppermost ends thereof; means joining the sides to the support adjacent the eye; means at the lowermost ends of the rods joining the same to corresponding bars medially thereof; an elongated tube slidable on the rods for holding the bars together when the tube is at the lowermost ends of its path of travel adjacent the bars; a pair of spaced, inwardly-extending pins rigid to one of the bars, the other bar being provided with pin-receiving openings; an outwardly-arched portion at each end of each bar respectively, said portions being in opposed relationship, presenting closed loops when the bars are together; an outwardly flared guide at the outermost end of each portion respectively, the pins and the openings being between said portions and adjacent thereto, said support being of yieldable material and the rods being biased apart whereby the bars separate as the tube is shifted upwardly along the rods; and means joining the sides to the outermost ends of the guides.

References Cited in the file of this patent

UNITED STATES PATENTS

| Number | Name | Date |
| --- | --- | --- |
| 852,951 | Harnischfeger | May 7, 1907 |
| 1,732,960 | Wetta, Sr. | Oct. 22, 1929 |
| 1,918,486 | Onos | July 18, 1933 |
| 2,359,539 | Dechar | Oct. 3, 1944 |

FOREIGN PATENTS

| Number | Country | Date |
| --- | --- | --- |
| 994 | Great Britain | A. D. 1904 |